United States Patent [19]

Frank et al.

[11] 4,281,068

[45] Jul. 28, 1981

[54] AQUEOUS POLYESTER EMULSIONS FOR THE PRODUCTION OF OPEN-PORE COATINGS

[75] Inventors: Walter Frank; Otto Bendszus; Hans J Freier; Hans-Joachim Traenckner, all of Krefeld, Fed. Rep. of Germany

[73] Assignee: Bayer Aktiengesellschaft, Fed. Rep. of Germany

[21] Appl. No.: 187,460

[22] Filed: Sep. 15, 1980

Related U.S. Application Data

[63] Continuation of Ser. No. 7,141, Jan. 29, 1979.

[30] Foreign Application Priority Data

Feb. 1, 1978 [DE] Fed. Rep. of Germany ....... 2804216

[51] Int. Cl.$^3$ ............................................... C08J 9/02
[52] U.S. Cl. .................................. 521/62; 260/28 R; 260/29.2 UA; 521/64; 521/138; 525/444
[58] Field of Search ..................... 260/28 R, 29.2 UA; 525/444; 521/64, 62, 138

[56] References Cited

FOREIGN PATENT DOCUMENTS 2221335 4/1975 Fed. Rep. of Germany .
1076319 7/1967 United Kingdom .

*Primary Examiner*—Morton Foelak
*Attorney, Agent, or Firm*—Connolly and Hutz

[57] ABSTRACT

Aqueous emulsions of unsaturated polyester resins comprising two "air-drying" polyesters, one polyester containing co-condensed polyalkylene glycol residues and the other polyester being free from groups such as these, can be hardened uniformly and relatively quickly to form tack-free, open-pore coatings, even on exotic woods.

6 Claims, No Drawings ial application Ser. No. 1,141, filed June 29, 1979, and now abandoned.

AQUEOUS POLYESTER EMULSIONS FOR THE PRODUCTION OF OPEN-PORE COATINGS

CROSS REFERENCE TO RELATED APPLICATION

This application is a continuation of application Ser. No. 1,141, filed June 29, 1979, and now abandoned.

This invention relates to aqueous emulsions based on unsaturated polyesters for the production of thin-layer resp. so-called open-pore coatings on wood or wood-like materials (for example on films imitating veneers).

An open-pore coating is a thin-layer (generally matt) lacquer coating in which the coherent lacquer film closely follows the pore structure and grain of the wood whilst leaving the natural quality of the wood surface intact. Open-pore coatings are mainly used for lacquering furniture. The customary coating agents are nitrocellulose lacquers. Unfortunately, such lacquer films which are only physically dried have no resistance to solvents. This disadvantage is obviated by using coating agents based on unsaturated polyesters.

Open-pore coatings can be produced from unsaturated polyester resins of high monomer content, in which case the lacquer is highly thixotropic (German Offenlegungsschrift No. 2,623,960). As the film hardens, the styrene which is almost exclusively used as monomer in lacquers of this type copolymerises with the unsaturated polyesters, so that, by comparison with nitrocellulose lacquer coatings, crosslinked, i.e. insoluble, lacquer coatings of high utility value are formed. However, evaporation losses of monomeric styrene during processing, for example in the casting machine and at the beginning of the film hardening process, cannot be avoided. The removal of the evaporated monomers from the waste air of the fabrication shops and drying installations is extremely expensive on account of the enormous quantities of air which have to be circulated.

One particular aspect of coating with unsaturated polyester resins is the well-known odour of the hardened lacquer film which is attributable to strong-smelling residual monomer and to the secondary products formed during hardening of the resin. This is particularly troublesome when it persists in the internal coating of furniture. In addition, coatings of unsaturated polyester resins on woods containing hardening-inhibiting ingredients harden unevenly. Thus, exotic woods such as rosewood, teak or macassar for example have to be provided with an insulating primer before coating with polyester resin.

Accordingly, an object of the present invention is to provide coating compositions based on unsaturated polyesters for the production of thin-layer resp. open-pore coatings on wood which do not have any of the disadvantages referred to above.

Polyesters of which the alcohol component contains β,γ-ethylenically unsaturated ether groups are known from German Pat. No. 2,221,355. These polyesters are applied monomer-free in admixture with photoinitiators and are hardened in a few seconds to complete non-tackiness by irradiation with UV-light. If the photoinitiators are replaced by standard peroxide catalysts, the coatings obtained show considerable tackiness which only disappears after a few hours.

It is known from British Pat. No. 1,076,319 that polyesters containing terminally co-condensed polyalkylene glycol units can be used as emulsifiers for the production of water-in-oil emulsions based on mixtures of unsaturated (monomer-containing) polyesters and/or polymerisable monomers and inert organic solvents. The emulsions obtained may be used for the production of lubricants, hydraulic fluids or polymers.

It has now surprisingly been found that monomer-free aqueous emulsions containing sealing agents and consisting of a mixture of at least two α,β-ethylenically unsaturated polyesters containing β,β-ethylenically unsaturated ether groups, of which one polyester contains polyalkylene glycol residues having molecular weights of 250–2000 in co-condensed form whilst the other polyester is free from groups such as these, can be hardened uniformly and relatively quickly to form tack-free thin-layer resp. open-pore coatings, even on resin-containing exotic woods.

Accordingly, the present invention provides monomer-free aqueous emulsions of

A. 10 to 90% by weight and preferably 15 to 70% by weight of mixtures of α,β-ethylenically unsaturated polyesters, B. 9.95 to 83% by weight and preferably 29.95 to 78% by weight of water, C. 0.05 to 2% by weight of a sealing agent and, optionally, D. up to 5% by weight of a thickener, the percentages by weight being based in each case on the sum of components A, B, C and D and the polyester mixture A containing a. from 50 to 95% by weight and preferably from 70 to 90% by weight, based on the sum of a and b, of at least one α,β-ethylenically unsaturated polyester which contains per 100 g of polyester a from 0.2 to 0.8 moles and preferably from 0.3 to 0.7 moles of β,γ-ethylenically unsaturated ether groups, but no co-condensed polyalkylene glycol residues having molecular weights of 250–2.000 and b. from 5 to 50% by weight and preferably from 10 to 30% by weight, based on the sum of a and b, of at least one α,β-ethylenically unsaturated polyester of which from 25 to 90% by weight and preferably from 30 to 80% by weight, based on b, consists of co-condensed polyalkylene glycol residues having a molecular weight of from 250 to 2000, preferably from 300 to 1000, and which contains per 100 g of polyester b from 0.04 to 0.5 and preferably from 0.1 to 0.4 moles of β,γ-ethylenically unsaturated ether groups.

The present invention also provides a process for the production of thin-layer resp. open-pore coatings, wherein the abovementioned monomer-free aqueous emulsion is provided with a hardening catalyst and is applied to wood or a woodlike substrate in a wet-film layer thickness of up to 200 μm, preferably up to 120 μm, dried at temperatures of from 20° to 150° C. and preferably at temperatures of from 40° to 100° C. and hardened at the same temperature or at a higher temperature, i.e. at a temperature of from 20° to 180° C. and preferably at a temperature of from 40° to 160° C., or by UV-irradiation, to the point where the substrates thus coated can be stacked.

In the context of the invention, the expression "monomer-free" means free from monomers which could copolymerise with the unsaturated polyesters a. and b.

By virtue of the absence of evaporating monomers, the process according to the invention enables thin-layer resp. openpore coatings on wood or wood-like materials to be produced under more pleasant conditions. In the presence of the added sealing agent, which is unusual for air-drying polyester-based coating compositions, the hardening time satisfies the requirements of assembly-line furniture production and the lacquer films have outstanding surface qualities. Hardening takes place without any problems, even on exotic woods, and the substantially odourless coating compositions are eminently suitable for the internal coating of furniture.

Preferred $\alpha,\beta$-ethylenically unsaturated polyesters a are the polycondensation products of at least one $\alpha,\beta$-ethylenically unsaturated dicarboxylic acid generally containing 4 or 5 carbon atoms or its ester-forming derivatives (for example anhydrides), optionally in admixture with up to 100 mole %, based on the unsaturated acid component, of at least one aliphatic saturated dicarboxylic acid containing from 4 to 10 carbon atoms or of a cycloaliphatic or aromatic dicarboxylic acid containing from 8 to 10 carbon atoms or its ester-forming derivatives (for example its anhydrides), with at least one hydroxy compound, preferably a polyhydroxy compound containing from 2 to 8 carbon atoms, of which the OH-groups which are not used for polycondensation are at least partly etherified with $\beta,\gamma$-unsaturated alcohols, i.e. polyesters of the type described for example in German Auslegeschrift No. 1,024,654.

In addition to the above mentioned components of polyester a, the $\alpha,\beta$-ethylenically unsaturated polyesters b have polyethylene glycol residues incorporated in them. The polyethylene glycol residues may be incorporated by condensation in known manner via polyethylene glycols during production of the polyesters or, as described in British Pat. No. 1,076,319, may be attached by condensation through addition of the corresponding alkylene oxides with the OH or COOH-groups of a preliminary polyester stage. However, polyalkylene glycol copolymer residues, for example ethylene oxide/propylene oxide copolymer chains with propylene oxide contents of less than 50 mole %, are also suitable. Preferred polyalkylene glycols are those in which the oxygen atoms are separated by at least two carbon atoms and, more particularly, by two to four carbon atoms. Particularly preferred polyalkylene glycols are polyethylene glycols.

The polyesters generally have acid numbers of from 1 to 40, preferably from 2 to 30, OH-numbers of from 10 to 120, preferably from 30 to 100, and molecular weights (determined as number averages) of from 300 to 5000, preferably from 500 to 2000.

In order to protect the coating compositions according to the invention against undesirable premature polymerisation, it is advisable to add from 0.001 to 0.1% by weight, based on component A, of polymerisation inhibitors or antioxidants during the actual production of the unsaturated polyesters.

Preferred auxiliaries of this type are, for example, phenols and phenol derivatives, preferably sterically hindered phenols, which contain $C_1$-$C_6$-alkyl substituents in both o-positions to the phenolic hydroxy group, amines, preferably secondary arylamines and their derivatives, quinones, copper salts of organic acids, and addition compounds of copper(I)halides with phosphites. Compounds of the type mentioned are, for example, 4,4'-bis-(2,6-di-tert.-butyl-phenol), 1,3,5-trimethyl-2,4,6-tris-(3,5-di-tert.-butyl-4-hydroxybenzyl)-benzene, 4,4'-butylidene-bis-(6-tert.-butyl-m-cresol), 3,5-di-tert.-butyl-4-hydroxy benzyl phosphonic acid diethyl ester, N,N'-bis-($\beta$-naphthyl)-p-phenylene diamine, N,N'-bis(1-methyl-heptyl)-p-phenylene diamine, N,N'-bis-(1-methylheptyl)-p-phenylene diamine, phenyl-$\beta$-naphthylamine, 4,4'-bis-($\alpha,\alpha$-dimethyl-benzyl)-diphenylamine, 1,3,5-tris(3,5-di-tert.-butyl-4-hydroxyhydrocinnamoyl)-hexahydro-s-triazine, hydroquinone, p-benzoquinone, toluhydroquinone, p-tert.-butyl pyrocatechol, chloranil, naphthoquinone, copper naphthenate, copper octoate, Cu(I)Cl/triphenyl phosphite, Cu(I)Cl/trimethyl phosphite, Cu(I)Cl/tris-chloroethyl phosphite and p-nitrosodimethyl aniline. Other suitable stabilisers are described in "Methoden der organischen Chemie" (Houben-Weyl), 4th Edition, Vol. XIV/1, pages 433–452, 756, Georg-ThiemeVerlag, Stuttgart, 1961. p-Benzoquinone for example in a concentration of 0.01 or 0.05% by weight, based on component A, is extremely suitable.

Suitable sealing agents C are waxes and, preferably, paraffins having a melting point of from 35° to 100° C. and preferably from 40° to 80° C. They are preferably added to the emulsions according to the invention in the form of aqueous dispersions and prevent polymerisation from being inhibited by the oxygen present in air.

Thickeners D, which are particularly necessary in the case of thinly liquid oil-in-water emulsions for producing the necessary processing viscosity of the coating compositions according to the invention, are described in Karsten, Lackrohstofftabellen, 6th Edition 1976, Paragraph 42.28 "Verdickungsmittel (thickeners)". It is preferred to use cellulose derivatives, for example methyl cellulose, urethane-based thickeners and special montmorillonites. They may be added either to the polyester mixture or to the water before emulsification or may even be subsequently stirred into the completed emulsion for after-thickening.

The emulsions for the coating compositions according to the invention may be prepared by stirring the water B into the polyester mixture A, for example by simple stirring or by means of dissolvers. In order to form a more finely divided emulsion, i.e. in order to introduce the shear forces more effectively, it is advantageous to add water in portions at temperatures below 30° C. Both water-in-oil and also oil-in-water emulsions are formed.

Hardening may be carried out in known manner by means of polymerisation-initiating radical formers (cf. for example Wagner/Sarx, Lackkunstharze, Chapter: Unsaturated Polyester Resins, 5th Edition, Verlag Karl Hanser, Stuttgart, 1971). It is preferred to use water-soluble peroxides, such as hydrogen peroxide and acetyl acetone peroxide; methylethyl ketone hydroperoxide, cyclohexanone peroxide or aqueous emulsions of water-insoluble initiators. Preferred accelerators are, for example, the heavy metal salts of carboxylic acids or the chelates of these metals, such as the acetates, naphthenates or acetyl acetonates of cobalt, manganese of vanadium. The accelerators may also be added in the form of aqueous solutions providing they are soluble in water, or in the form of aqueous emulsions if they are not soluble in water. Normal quantities, i.e. from 0.5 to 5% by weight of peroxide and from 0.01 to 0.2% by weight of siccative metal, based on the sum of components A and B, generally guarantee excellent hardening.

In order to protect light-sensitive substrates, for example light woods, it is possible to add to the coating compositions relatively small quantities of the usual UV-absorbers, for example 2-hydroxy-4-methoxy benzophenone, or the cinnamic acid and benzotriazine derivatives normally used.

Standard additives and dyes, preservatives, delustring agents, levelling agents and pigments may also be added in order to obtain special effects providing they do not significantly affect either the stability of the emulsion or the polymerisation reaction.

The coating compositions according to the invention are eminently suitable for processing on conventional lacquering lines equipped with coating machines, for example by the active primer process (cf. German Auslegeschrift No. 1,025,302), and by virtue of their long open processing times are also suitable for casting in catalysed and siccativated form.

The coating compositions according to the invention may also be applied by roll coating and spray-coating in the usual way (Wagner/Sarx, Lackkunstharze, 5th Edition, Verlag Karl Hanser, 1971, pages 140, 141, and Weigel, Katalytische Lackhartung und ihre Rohstoffe (Catalytic Lacquer Hardening and Its Raw Materials), Wissenschaftliche Verlagsgesellschaft, 1962, pages 192–202).

The following Examples are intended to illustrate the invention and, by a comparison with a styrene-containing unsaturated polyester resin, to demonstrate the superior hardening of the coating compositions according to the invention on exotic woods.

EXAMPLES

Polyesters with the following composition (in moles) and characteristics were used in the emulsions according to the invention:

| Polyester a | $a_1$ | $a_2$ | $a_3$ |
|---|---|---|---|
| Maleic acid anhydride | 1.0 | 1.0 | 0.7 |
| Adipic acid | — | — | 0.3 |
| 1,2-propane diol | 0.55 | 0.55 | 0.95 |
| Benzyl alcohol | — | 0.5 | — |
| Trimethylol propane diallyl ether | 1.0 | 0.5 | 0.4 |
| Acid number | 22 | 22 | 16 |
| Viscosity [mPa.s], as measured on a 70% by weight solution in styrene at 20° C. | 100 | 315 | 350 |

| Polyester b | $b_1$ | $b_2$ | $b_3$ |
|---|---|---|---|
| Maleic acid anhydride | 1.0 | 1.0 | 1.0 |
| Diethylene glycol | — | 0.5 | — |
| Polyethylene glycol (MW 400) | 0.79 | 0.46 | — |
| Polyethylene glycol (MW 1200) | — | — | 0.8 |
| Trimethylol propane diallyl ether | 0.4 | 0.4 | 0.4 |
| Acid number | 27 | 19 | 18 |
| Viscosity [mPa.s], as measured on a 70% by weight solution in styrene at 20° C. | 560 | 270 | 50 |

Composition and production of the emulsions according to the invention (in parts by weight):

| Example | 1 | 2 | 3 | 4 | 5 | 6 |
|---|---|---|---|---|---|---|
| Polyester | | | | | | |
| a 1 | 80 | 80 | 80 | 80 | | |
| a 2 | | | | | 80 | |
| a 3 | | | | | | 70 |
| b 1 | 20 | 20 | | | 20 | 30 |
| b 2 | | | 20 | | | |
| b 3 | | | | 20 | | |
| Water | 100 | 140 | 100 | 100 | 140 | 140 |
| Thickener | | 5 | | 5 | 6 | 3 |
| Sealing agent emulsion | 4 | 4 | 4 | 4 | 4 | 4 |

To prepare the emulsion, the water (except in Example 2) was stirred in by hand in three portions at 25° C. following addition of the thickener, and the sealing agent emulsion was added. Water-in-oil emulsions were obtained.

In Example 2, the emulsion was prepared with a solids content of 70% by weight by means of a dissolver (8000 rpm) at temperatures up to at most 45° C. and subsequently dissolved with the residual water at 1000 rpm. At oil-in-water emulsion was obtained. The thickener was added immediately before casting with the casting machine.

Thickener: Borchigel L 75(Trade Mark) (Karsten, Lackrohstofftabellen, 6th Edition, page 554).

Sealing agent emulsion: 10 parts by weight of paraffin (m.p. 57°–60° C.) emulsified in 90% by weight of a 6% by weight aqueous polyvinyl alcohol solution (polyvinyl alcohol; saponification number 140, viscosity: 25 [mPa.s], as measured on a 4% by weight aqueous solution at 20° C.).

80 g/m² of emulsion, catalysed with 3 parts by weight of $H_2O_2$ (35% by weight) and siccativated with 2 parts by weight of an aqueous cobalt acetate solution (=5% by weight of metal), based on 100 parts by weight of the emulsion, were coated or cast onto primed sample boards of veneered oak. The following roller-applied primer was used: 70 parts by weight of a 25% by weight solution of alcohol-soluble nitrocellulose (medium-viscosity) in isopropanol/ethyl glycol (2:1 parts by weight) and 30 parts by weight of a 40% by weight solution of a cyclohexanone formaldehyde resin, softening point 75°–90° C. (DIN 53 180), in isopropanol.

The applied lacquer films were dried in a flat tunnel at 50° C. in air circulating at a rate of 2 meters per second.

| Drying Example | 1 | 2 | 3 | 4 | 5 | 6 |
|---|---|---|---|---|---|---|
| Drying time, mins. | 20 | 23 | 24 | 32 | 25 | 22 |
| Pore flow | good | very good | good | satisfactory | good | good |
| Scratch resistance | all laquer films scratch-resistant | | | | | |
| Levelling | very good | very good | very good | good | good | good |

The following comparison illustrates the superior hardening of the coating compositions according to the invention on wood containing hardening-inhibiting ingredients. A lacquer of a standard commercial-grade polyester resin of 0.7 mole of maleic acid anhydride, 0.3 mole of phthalic acid anhydride and 1.05 mole of 1,2-propane diol, in the form of a 50% by weight solution in styrene (catalysed, siccativated and with sealing agent added) was applied for comparison.

| Sample board: | Teak, coating: 150 g/m² | |
|---|---|---|
| | Example 2 according to the invention | Comparison |
| Drying at 30° C. | 1 hour | still liquid |

| Sample board: | Teak, coating: 150 g/m² Example 2 according to the invention | Comparison |
|---|---|---|
| | | after 24 hours in the wood pores. |

We claim:

1. A monomer-free aqueous emulsion comprising
   A. 10 to 90% by weight of a mixture of $\alpha,\beta$-ethylenically unsaturated polyesters,
   B. 9.95 to 83% by weight of water,
   C. 0.05 to 2% by weight of a paraffin wax sealing agent having a melting point of 35° to 100° C. and,
   D. 0 to 5% by weight of a thickener,
   the percentages by weight, being based on the sum of components A, B, C and D and the polyester mixture A containing
   (a) 50 to 95% by weight, based on the sum of (a) and (b), of at least one $\alpha,\beta$-ethylenically unsaturated polyester which contains per 100 g of polyester (a) from 0.2 to 0.8 moles of $\beta,\gamma$-ethylenically unsaturated ether groups, but which is free of co-condensed polyalkylene glycol residues having molecular weights of 250–2,000, and
   (b) 5 to 50% by weight, based on the sum of (a) and (b), of at least one $\alpha,\beta$-ethylenically unsaturated polyester of which from 25 to 90% by weight, based on (b), consists of co-condensed polyalkylene glycol residues having a molecular weight of from 250 to 2,000 and which contains per 100 g of polyester (b) from 0.4 to 0.5 mole of $\beta,\gamma$-ethylenically unsaturated ether groups.

2. An emulsion as claimed in claim 1, wherein the polyester mixture A contains 70 to 90% by weight of component (a) and 10 to 30% by weight of component (b).

3. An emulsion as claimed in claim 1, wherein the polyester (a) contains 0.3 to 0.7 moles of $\beta,\gamma$-ethylenically unsaturated ether groups per 100 g.

4. An emulsion as claimed in claim 1, wherein 30 to 80% by weight of polyester (b) consists of co-condensed polyalkylene glycol residues.

5. An emulsion as claimed in claim 1 wherein the co-condensed polyalkylene glycol residues in polyester (b) have a molecular weight of from 300 to 1,000.

6. An emulsion as claimed in claim 1, wherein polyester (b) contains from 0.1 to 0.4 moles of $\beta,\gamma$-ethylenically unsaturated ether groups per 100 g.

* * * * *

UNITED STATES PATENT OFFICE
CERTIFICATE OF CORRECTION

Patent No. 4,281,068　　　　　　Dated July 28, 1981

Inventor(s) Walter Frank et al

It is certified that error appears in the above-identified patent and that said Letters Patent are hereby corrected as shown below:

Column 2, line 9, "$\beta,\beta$" should read --$\beta,\gamma$--.

Column 8, line 9, "0.4" should read --0.04--.

Signed and Sealed this

Nineteenth Day of January 1982

[SEAL]

Attest:

Attesting Officer

GERALD J. MOSSINGHOFF

Commissioner of Patents and Trademarks